United States Patent [19]

Donnelly et al.

[11] Patent Number: 5,409,382
[45] Date of Patent: Apr. 25, 1995

[54] MECHANICAL SIMULATOR FOR MODELING THERMAL PROPERTIES OF A PREMATURE INFANT

[75] Inventors: Michael M. Donnelly, Cincinnati; William A. Olson, Fairfield, both of Ohio

[73] Assignee: Hill-Rom Company, Inc., Batesville, Ind.

[21] Appl. No.: 55,974

[22] Filed: Apr. 30, 1993

[51] Int. Cl.$^6$ .................................. G09B 23/28
[52] U.S. Cl. ..................................... 434/267; 434/262
[58] Field of Search ...................... 434/268, 267, 262

[56] References Cited

U.S. PATENT DOCUMENTS 2,752,697  7/1956  Lawall ............................. 434/268

FOREIGN PATENT DOCUMENTS 2191884  12/1987  United Kingdom ............... 434/267

OTHER PUBLICATIONS

Wheldon, A. E., Energy balance in the newborn baby: use of a manikin to estimate radiant and convective heat loss, Phys. Med. Biol., vol. 27, No. 2, 285-296, Great Britain, 1982.
Donnelly, Michael M., Essential Background For The Design of A Neonatal Bed, Perinatal Research Institute, Chapter 7, 28-30, Cincinnati, Ohio, Jan. 1988.

Primary Examiner—Gene Mancene
Assistant Examiner—Jeffrey A. Smith
Attorney, Agent, or Firm—Wood, Herron & Evans

[57] ABSTRACT

An infant simulator for modeling the thermal properties of premature infants comprises a head, a pair of arms, a pair of legs, and a torso, a fluid circuit connecting and supplying fluid from a fluid source to the pair of arms, pair of legs and torso, a pump in the torso for circulating fluid through the simulator, and a synthetic skin for simulating insensible water loss in a premature infant.

28 Claims, 4 Drawing Sheets

MECHANICAL SIMULATOR FOR MODELING THERMAL PROPERTIES OF A PREMATURE INFANT

FIELD OF THE INVENTION

This invention relates generally to the testing and evaluation of neonatal beds, and more particularly to a mechanical device which simulates a premature infant for testing and evaluating a neonatal bed.

BACKGROUND OF THE INVENTION

Premature babies require intensive nursing and medical care over the first few critical days of life. The chances of survival for these premature babies is dramatically increased if care is taken to keep them warm.

Traditionally, a warm environment has been provided in which the premature infant may subsist in the form of an incubator. The air inside the incubator is heated to a preselected temperature and circulated by a fan. The air temperature is either selected according to the baby's weight and post-natal age, or by using a servo control system to maintain the temperature of a skin site at an appropriate value.

Another type of neonatal bed employed in neonatal intensive care units is the radiant warmer. In a radiant warmer a radiative heat source is located within an enclosure. Radiated heat from the source maintains the skin temperature of the premature infant at a predetermined level, again by either correlating the desired air temperature to the baby's weight and post-natal age, or by using a servo control system to maintain the temperature of a skin site at an appropriate value.

A problem facing manufacturers of incubators and radiant warmers is the lack of a suitable infant thermal simulator for use in testing and evaluation of incubators and radiant warmers which accurately models the thermal characteristics of a premature infant.

A number of devices have heretofore been employed to attempt to simulate the thermal properties of an infant in order that the testing of incubators and radiant warmers could be performed. Some of these devices include a water-filled copper shell, a water-filled child's doll which has an internal heater, a segmented aluminum mannikin filled with water, an internally heated hollow copper ellipsoid filled with water, a mean hemispherical radiant temperature thermopile, a black anesthesia bag filled with water and a hollow copper sphere filled with water.

All of the above prior art devices have been deficient in modeling the thermal characteristics of a premature infant primarily because these devices do not account for heat losses due to water loss as a result of evaporation ("insensible water loss") encountered by a premature infant. The premature infant loses heat by a combination of conduction, convection, radiation and evaporation. Therefore, any mechanical model which simulated only conduction, convection, and radiation would not properly thermally model the thermal characteristics of a premature infant.

Conduction of heat takes place from the skin of an infant to the mattress of the bed. Convective loss occurs by normal respiratory expiration and by convective heat transfer at the skin surface. Heat transfer by radiation is a function of temperature gradients and the effective areas for exchange between the infant's skin and the surrounding surfaces. Lastly, evaporative heat loss is primarily influenced by the air velocity and the relative humidity in the convective incubator and the dissipation through absorption of infrared energy on the surface of the skin with radiant warmers. Each gram of water evaporated consumes 0.58 kcal of heat. For an incubator these water losses contribute to the overall heat losses of the infant. For a radiant warmer the heat necessary to support the evaporation process is provided by the infrared heating source with the management problem being that of maintaining the appropriate water balance through increased fluid intake or shielding the infant to reduce water losses. The natural diffusion of water through the skin and its subsequent evaporation can account for approximately 50% of the heat loss in a premature infant. Accordingly, any infant thermal simulator which does not account for these evaporative losses could therefore be in error by as much as 50%.

A mechanical infant simulator must therefore exhibit certain physical characteristics; at the same time, however, the simulator must be as anatomically correct as possible. In order to properly simulate the above heat transfer modes, the simulator must have a mass, surface area, metabolic heat production, insensible water loss and heat storage capacity corresponding to the age (and size) of the infant simulated.

Anne E. Wheldon and Michael M. Donnelly, in respective papers entitled "Energy Balance Of A Newborn Baby: Use Of A Mannequin To Estimate Radiant And Convective Heat Loss," published in 1982 by the Institute of Physics, and "Essential Background For The Design Of A Neonatal Bed," published in 1988 by the Perinatal Research Institute, Cincinnati, Ohio, proposed the use of a combination of cylinders and spheres with which to model the thermal characteristics of a premature infant. In the Wheldon paper, the simulator had a spherical head, a cylindrical trunk with two closed ends and four cylindrical limbs, each with one closed end. The head was attached to the trunk by a short polystyrene "neck". The open ends of the limbs were fitted with polystyrene plugs which were opposed to polystyrene disks on the trunk. The spherical head was fabricated of a thin copper ballcock; 20-gauge aluminum tubing was utilized for the curved surfaces of the limbs and trunks and 16-gauge aluminum sheet for the tube ends. The simulator was designed to represent an average full term newborn of birth weight 3.3 kg and surface area 0.23 m$^2$. The diameters and lengths of the limbs and trunk were selected to give the correct regional surface areas. The simulator was heated using resistance wire.

In the Donnelly paper, it was proposed that separate simulators be fabricated to simulate infants less than 1,000 grams and infants greater than 2,500 grams due to the significantly different thermal properties of each. Heat loss for infants with birth weights greater than 2500 grams would not require an independent insensible water loss simulation to account for this mode of heat loss because the contribution of this heat loss could be simulated by increasing the surface area of the simulator. Increasing the surface area on the greater than 2500 gram simulators would not significantly alter the surface to mass ratio. However for infants with less than 2500 gram birth weights, in particular infants less than 1000, the water losses for these infants are so high in the first week of life that simulating this mode of heat loss by increasing the surface area of the simulator would significantly alter the surface to mass ratio, therefore maintaining the appropriate balance between the various compartments of heat loss (conductive, convective, radiative and evaporative) and simulating the correct surface to mass ratio would be critical to effective dynamic heat simulation. The paper proposed the use of a known formula for correlating infant surface area to the weight and height of the infant:

$$\text{Surface Area (m}^2) = \text{Weight}^{0.5378} \text{(kg)} \times \text{Length}^{3.965} \text{(cm)} \times 0.024265$$

The paper noted that while the specific heat capacity of premature infants had not been investigated, a reasonable assumption would be that of an adult or 0.86 cal/gm/°C. The paper then noted that the coefficient of thermal conduction for an adult ranges from 0.47 to 0.6 W/m°C. in a vasoconstricted state and from 3.76 to 4.81 W/m° C. in a vasodialated state. The paper also noted that the metabolic heat production for infants was estimated to range from a minimum of 1.75 to a maximum of 4.37 kcal/kg/hr, and that the insensible water loss rate for infants less than 1,250 grams ranges from 2.4 to 4.08 g/kg/hr, translating into a range of heat loss from 1.24 to 2.37 kcal/kg/hr. With this information, the Donnelly paper then proposed the construction of a simulator utilizing copper cylinders painted with black matte lacquer paint and filled with water having a specific heat capacity of 0.99 cal/g/°C. at 37° C. which would simulate the specific heat capacity of human tissue. The paper also proposed simulating metabolic heat production by including an aquarium heater in one of the simulator cylinders. The Donnelly paper noted that evaporative heat and water losses were difficult to simulate, but suggested one approach might be the use of synthetic skin as the outer surface for a simulator.

These two proposed simulators were not without criticism however. Neither included any means for simulating insensible water loss nor any means for simulating a fluid circulatory system which would mimic advective heat transfer fluid flow to the limbs of the simulator. As described above, the lack of any means with which to simulate insensible water loss leads to simulation errors of up to about 50%. The lack of any means for simulating a circulatory system can lead to a "hot spot" in the simulator in the area of the heater or the circulating pump, which adversely affects the ability of the simulator to adequately model infant static and dynamic thermal responses.

SUMMARY OF THE INVENTION

It has therefore been an objective of the present invention to provide an infant simulator which more accurately simulates thermal properties of an infant by including structure for simulating the insensible water loss of the infant.

It has been another objective of the present invention to provide an infant simulator which includes a fluid circulatory system in order that the simulator be able to mimic advective heat transfer by fluid flow to the extremities of the simulator. In accordance with the stated objectives of the present invention and a preferred embodiment thereof, there is provided an infant simulator for modeling the thermal properties of premature infants which comprises a head, a pair of arms, a pair of legs, and a torso, a fluid circuit connecting and supplying fluid from a fluid source to the pair of arms, pair of legs and torso, a pump in the torso for circulating fluid through the simulator, and means for simulating insensible water loss in the premature infant. The head, pair of arms, pair of legs and torso are constructed of thin walled copper cylinders and are painted black. There is a manifold included in the torso, a respective supply tube connecting the manifold to the head, each arm and leg and the torso, and a respective return tube connecting the head, each arm and each leg to the torso. The means for simulating insensible water loss comprises an aperture in the torso, and filter media covering the aperture. The infant simulator further includes a heater in the torso. A controller is provided for independently controlling the pump and the heater.

The simulator is preferably sized to model the thermal characteristics of an approximately 650 gram infant. In so doing, the head cylinder is about 2.858 in long and has an outside diameter of about 1.906 in, each of the arm cylinders is about 4.673 in long and has an outside diameter of about 0.540 in, each of the leg cylinders is about 6.949 in long and has an outside diameter of about 0.650 in, and the torso cylinder is about 4.661 in long and has an outside diameter of about 1,807 in. The cylinders have a wall thickness of about 0.016 in. The aperture in the torso has an area of about 5,177 in². The pump generates a fluid flow rate of about 125 ml/min. The simulator has an insensible water loss rate of about 2.0 g/hr. And the heater produces about 7.9 W.

One advantage of the present invention is that an infant simulator has been provided which, in addition to simulating the conductive, convective and radiative characteristics of an actual premature infant, also simulates the heat losses due to insensible water loss.

Another advantage of the present invention is that an infant simulator has been provided which includes a fluid circulatory system which mimics advective heat transfer by fluid flow to the limbs.

These and other objects and advantages of the present invention will become more readily apparent during the following detailed description taken in conjunction with the drawings herein, in which:

DETAILED DESCRIPTION OF THE INVENTION

Figure 1:
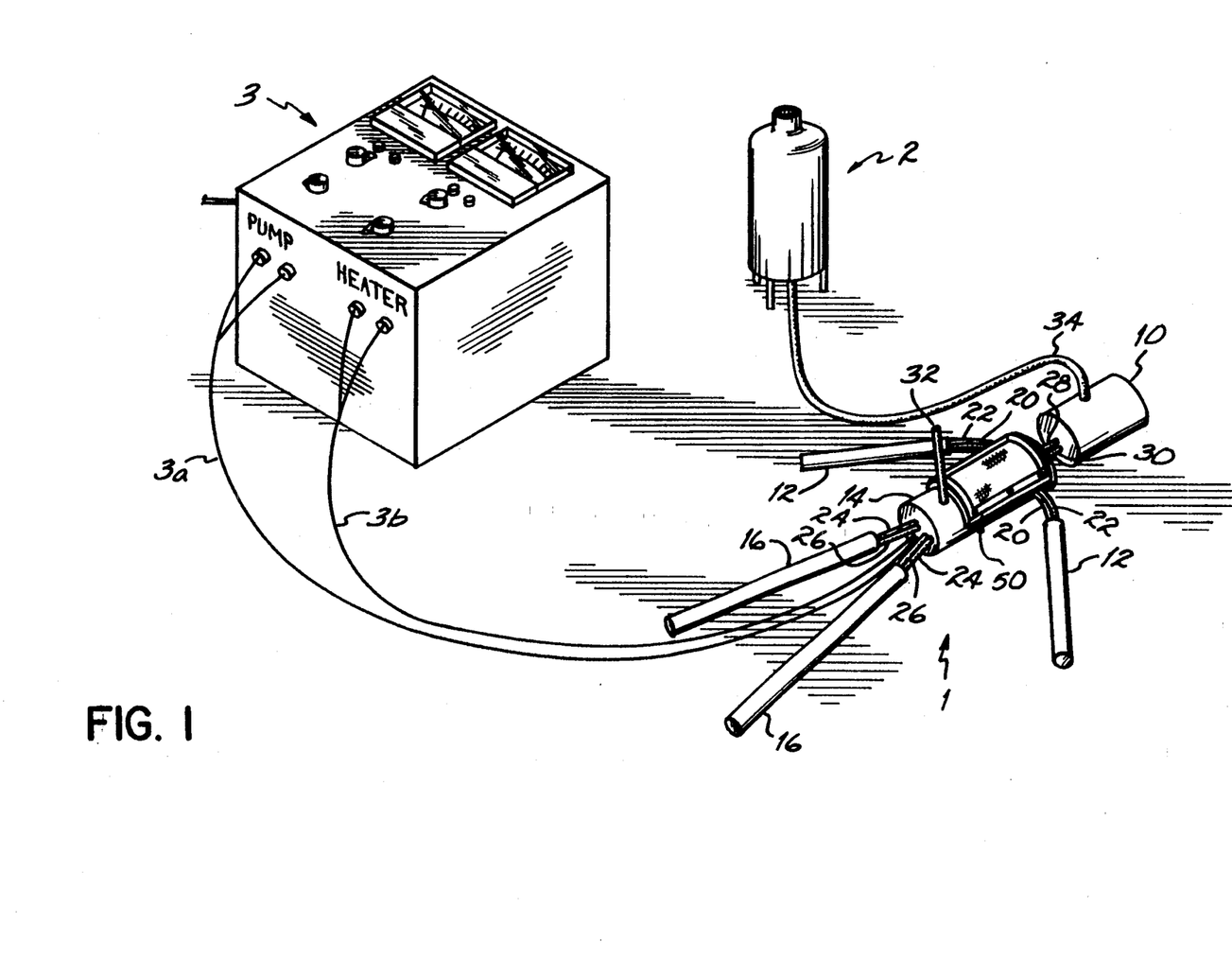
FIG. 1 is a perspective view of the infant simulator of the present invention with controller and fluid source.

With reference first to FIG. 1, there is illustrated the mechanical infant simulator 1 of the present invention. The simulator 1 is supplied with water from a water source in the form of a bottle 2 and is controlled and powered by a suitable controller/power supply 3.

Figure 2:
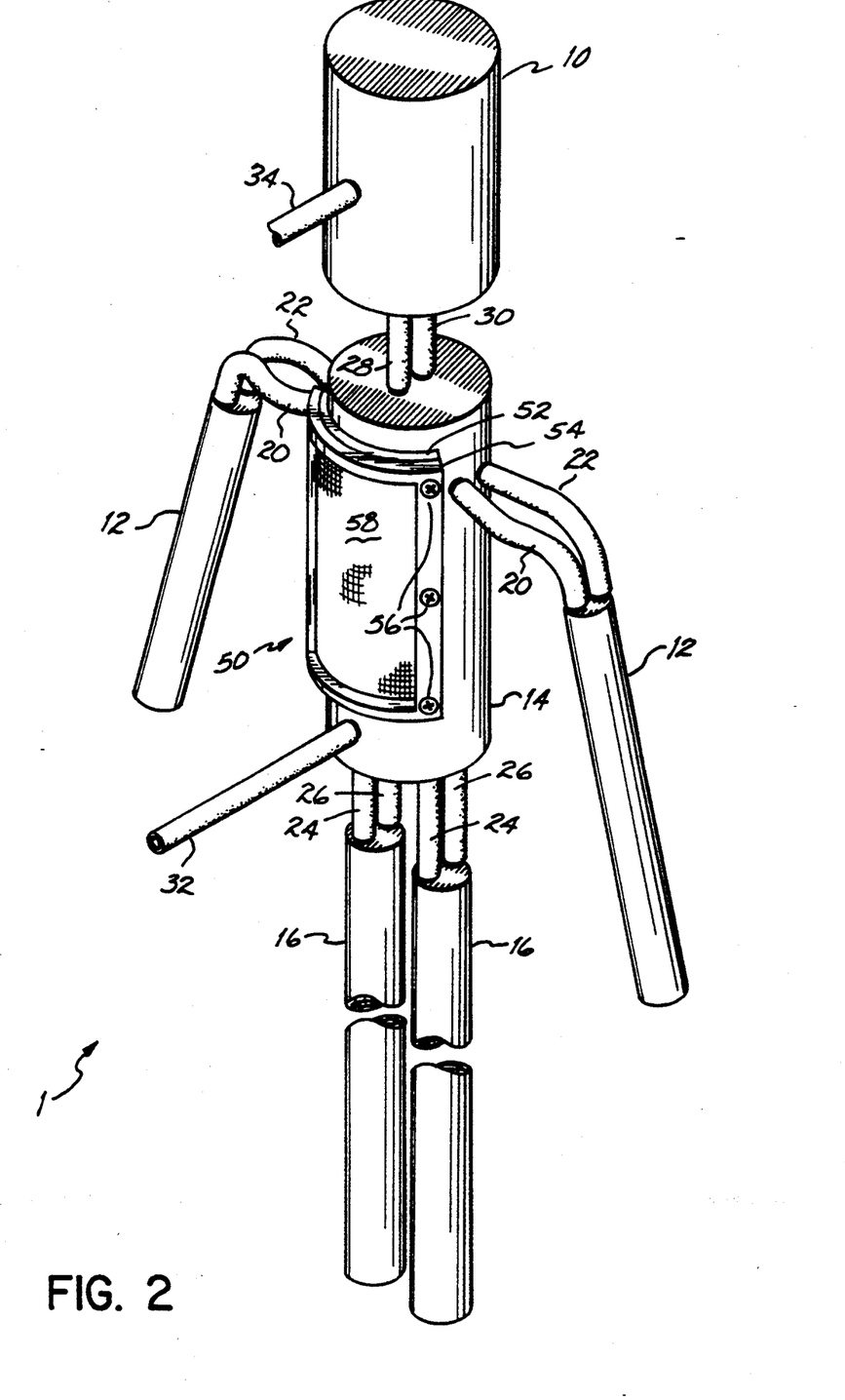
FIG. 2 is an enlarged perspective view of the infant simulator FIG. 1.
Figure 3:
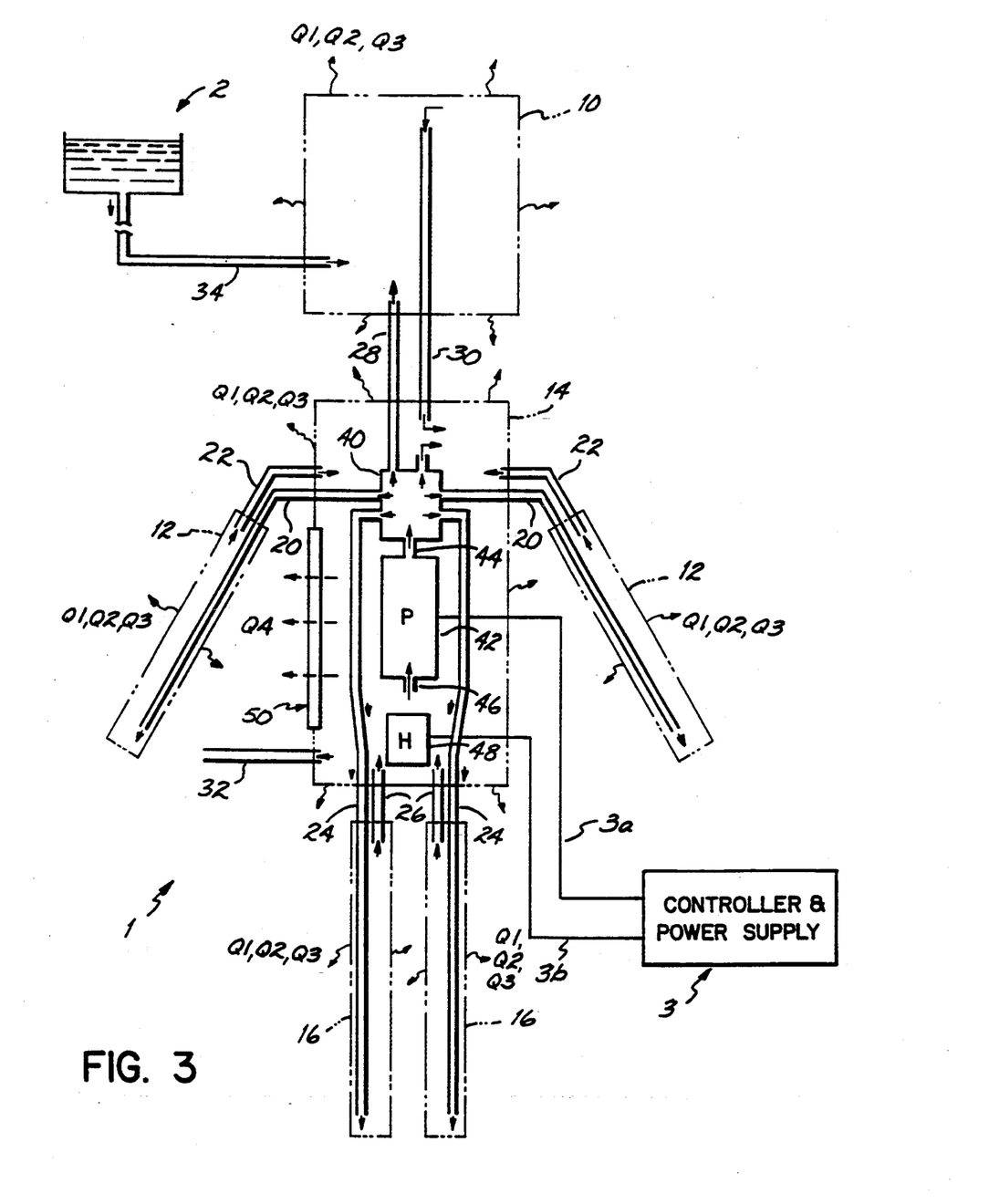
FIG. 3 is a schematic view of the infant simulator of FIGS. 1 and 2 illustrating the fluid circuit and components.

Referring now to FIGS. 1-3, the simulator 1 includes a head 10, a pair of arms 12,12, a torso 14 and a pair of legs 16,16. There are two tubes connecting each of the appendages of the simulator 1 to the torso 14. Each of the pair of arms 12,12 has connected between it and the torso 14 a supply tube 20 and a return tube 22. Similarly, each of the pair of legs 16,16 has connected between it and the torso 14 a supply tube 24 and a return tube 26. Head 10 likewise has a supply tube 28 and a return tube 30 connected between it and the torso 14. A vent tube 32 is attached to the torso 14 and is open to the atmosphere, and an overall supply tube 34 is connected between the water source 2 and head 10.

Each of the supply tubes connecting each of the appendages to the torso 14 is connected within torso 14 to a manifold 40. A pump 42 is connected to the manifold 40 at a connection 44 and draws water from within torso 14 at an inlet 46. A heater 48 is also located within the torso 14. Both the pump 42 and heater 48 are controlled and powered via the controller/power supply 3 and are connected thereto via leads 3a and 3b respectively.

There is a synthetic skin 50 mounted to the torso 14. The synthetic skin 50 takes the form of a rectangular shaped arcuate frame 52 fixedly secured to the torso 14 and which frames an aperture (not shown) in the torso 14. A separate removable rectangular shaped arcuate frame member 54 is removably secured to the fixed frame member 52 via fasteners 56 and secures therebetween a piece of filter media or paper 58.

The appendages of the simulator 1, as well as the torso 14, are all fabricated of copper cylinders. The cylinders are painted matte black in order to simulate the emissivity of human skin. All of the tubing connecting the appendages to the torso 14, as well as the supply tube 2 to the simulator's head 10 is Tygon Formulation R-1000 plastic tubing. Fixed frame member 52 and removable frame member 54 are fabricated of brass. The filter media 58 is Versapor 200, manufactured by Gelman Sciences, 600 South Wagner Road, Ann Arbor, Mich. 48106. The manifold 40 and tube supports (not shown) for supporting the tubes within the simulator are fabricated of plastic, for example an acetal plastic such as Celcon.

TABLE 1

SIMULATOR PHYSICAL PARAMETERS
(Target Values vs. Actual Values)

| Parameter | Target | Actual |
| --- | --- | --- |
| Mass | 750 g | 644 g |
| Surface to Mass Ratio | 1.35 | 0.94 |
| Area | 1012.5 cm$^2$ | 604.45 cm$^2$ |
| Head Area Component | 0.23 | 0.21 |
| Torso Area Component | 0.33 | 0.31 |
| Arm Area Component | 0.16 | 0.17 |
| Leg Area Component | 0.27 | 0.31 |
| Head Length/Diameter | sphere head | 1.5 |
| Torso Length/Diameter | 1.78 | 2.58 |
| Arm Length/Diameter | 6 | 8.66 |
| Leg Length/Diameter | 4.66 | 10.69 |
| Metabolic Heat Production | 2.03–5.07 W/kg | 1.25 (pump)–12.14 W/kg (heater max) |
| Insensible Water Loss | 1.44–4.08 g/hr-kg | 2.30 g/hr-kg |
| Heat Storage Capacity | 3120 J/K (2009 @ 650 g) | 1907 J/K |

Referring to Table 1 above, there are listed several values of parameters for a "target" simulator, which target values were derived from the Wheldon and Donnelly papers. Also tabulated are the values of these parameters for the "actual" simulator of the present invention. "Mass" is simply the mass of the simulator. "Area" is the surface area of the simulator. "Surface to Mass Ratio" is the ratio of "Area" to "Mass". "Head Area Component", "Torso Area Component", "Arm Area Component" and "Leg Area Component" are the ratios of the surface area of the simulator's head, torso, arm and leg to the "Area" respectively. "Head Length/Diameter", "Torso Length/Diameter", "Arm Length/Diameter" and "Leg Length/Diameter" are the ratios of the length to the diameter of the simulator's head, torso, arm and leg respectively.

Figure 4:
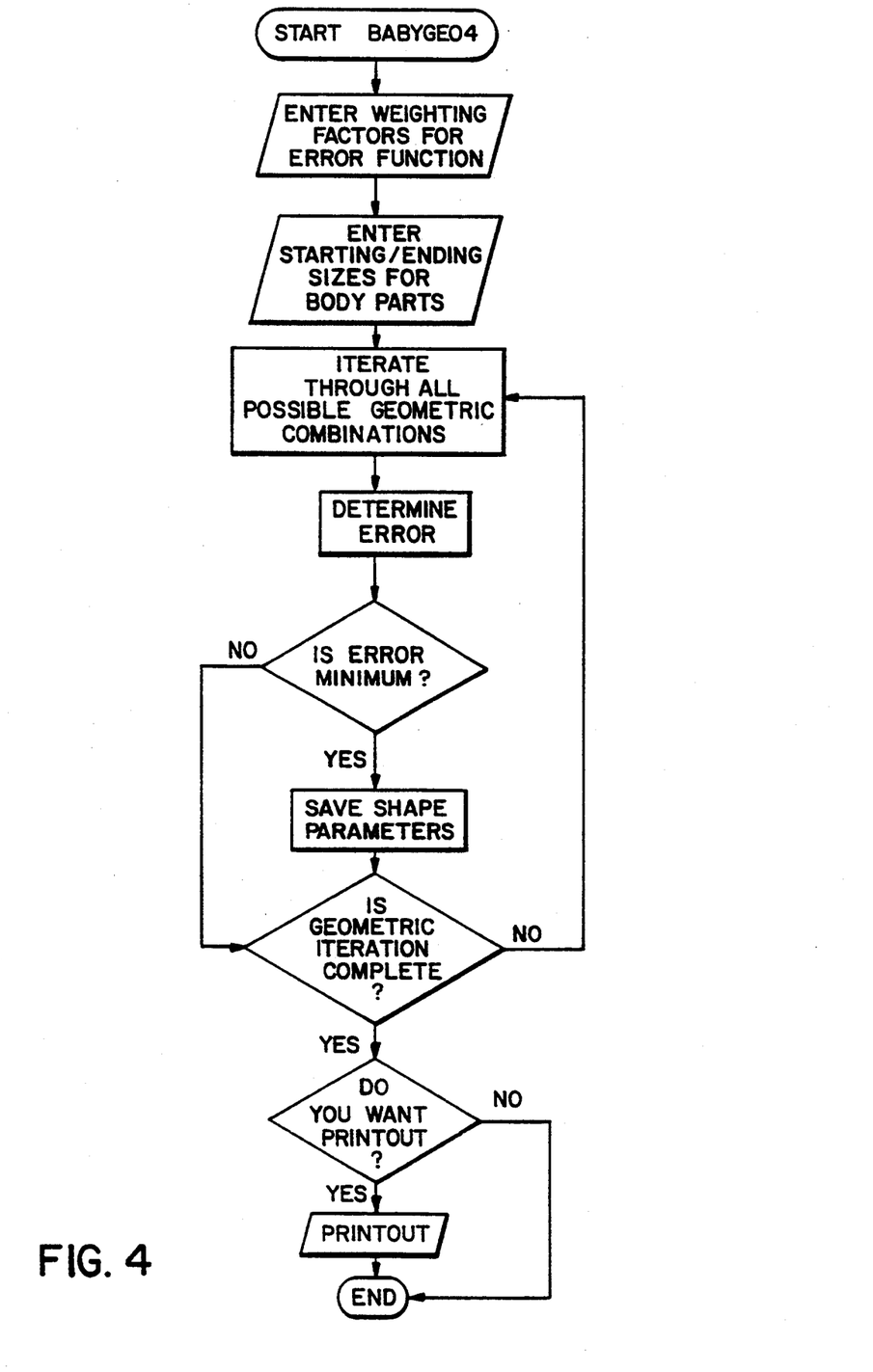
FIG. 4 is a flowchart of a computer program designed to calculate the geometry of the components of the simulator.

In order to compute the dimensions of the torso and limbs of the simulator 1, a computer program (BABYGEO4.C) was developed, a flow chart for which is shown in FIG. 4. Referring to the FIG. 4 flowchart, it will be seen that ranges for each body part of the simulator are entered. The Table 1 geometric target values are entered as well. The computer program then iterates through all possible geometric combinations of the body parts, while computing the error for each combination when compared to the entered target values (Table 1). When the error is within an acceptable level, the actual values of the body parts are printed or otherwise displayed. The actual values of the body parts are computed while maintaining the surface to mass ratio as close as possible to that of an actual infant. The actual computer program, along with a sample printout, is included at the end of this Detailed Description and before the Claims.

To simulate a premature infant on the order of 650 grams, the head, arm, leg and torso cylinders have the following respective approximate dimensions: 2.85 in long and outside diameter of 1.906 in; 4.673 in long and outside diameter of 0.540 in; 6.949 in. long and outside diameter of 0.650 in; and 4.661 in long and outside diameter of 1.807 in. All the cylinders have a wall thickness of about 0.016 in. The tubing has an inner diameter of 0.170 in. The aperture in the torso 14 which the filter media 58 covers has an area of about 5.177 in$^2$. The insensible water loss rate is about 2.0 g/hr. The pump 42, a reciprocating pump R60, 307 from Edmund Scientific, is sized to selectively generate a head or flow rate of about 1l/min, while it is set at about 125ml/min to simulate the 650 gram infant. Lastly, the heater 48 is sized to selectively generate up to about 12.14 W/kg on its highest setting, while it is set at about 7.9 W to simulate the 650 gram infant.

In use, the cylinders of the simulator 1 are filled with water, as is the supply 2. As the circulatory system of the simulator 1 is an "open" system, the height of the level of water in the vent tube 32 will be the same as the height of the level of the water in the bottle 2 as seen in FIG. 1. The controller/power supply 3 is powered up to power the pump 42 and heater 48. The pump 42 generates approximately 1.25 W/kg (see Table 1 above), while the heater 48 is sized to generate approximately 12.14 W/kg on its highest setting, but can be adjusted via controller/power supply 3 so as to fall within the target range (7.9 W for 650 g infant). The pump 42 supplies water to the manifold 40 from the torso 14, the torso 14 acting as a reservoir. Water is pumped through the manifold 40 and to the pair of arms 12,12, pair of legs 16,16 and head 10 via supply tubes 20,20, 24,24 and 28, respectively. Water circulates through the respective cylinders 12,12, 16,16 and 10 representing the arms, legs and head of an infant, and then returns to the torso 14 via the respective return tubes, 22,22, 26,26 and 30. There the water is simply dumped back into the reservoir which is the torso 14.

Conductive, convective and radiative heat losses are shown in FIG. 3 as Q1, Q2 and Q3 respectively. In addition, the heat loss due to water permeating the filter media membrane 58, which simulates insensible water loss—H$_2$O loss due to evaporation—is denoted as Q4.

By providing the synthetic skin 50, the simulator 1 of the present invention is able to better simulate the thermal characteristics of an actual premature infant by accounting for the up to 50% heat loss which is due to the insensible water loss of a premature infant. In addition, by including pump 42, manifold 40 and the respective supply and return tubes which connect the appendages of a simulator 1 to the torso 14, the simulator of the present invention is operable to mimic advective heat transfer by fluid flow to all the appendages, thereby providing better static and dynamic simulation of thermal responses. In other words, the circulatory system avoids a "hot spot" which would ordinarily occur in the torso cylinder 14 near the pump 42 and heater 48 due to the heat generated by the pump 42 and heater 48. However, with the circulatory system of the present invention, it has been noted that the temperature at the remotemost locations of the appendages differs by 1°–2° C. from that at the torso 14.

Those skilled in the art will readily recognize numerous adaptations and modifications which can be made to the mechanical infant simulator of the present invention which will result in an improved simulator, yet all of which will fall within the spirit and scope of the present invention as defined in the following claims. Accordingly, the invention is to be limited only by the scope of the claims and their equivalents.

```
/* BABYGEO4.C      Latest Revision: 7/26/91  This program calculates the optimal size for the infant simulator for a model
with a cylindrical head. It also tries to print the screen from a 'p' press. */
#include <stdio.h>
#include <math.h>
include <string.h> define PI 3.141592645               /* Obvious                                          */
define HRATIO 1.0                   /* Target ratio for length/diameter for Head        */
#define TRATIO 1.77885               /* Target ratio for length/diameter for Torso       */
#define ARATIO 6.0                   /* Target ratio for length/diameter for Arms        */
#define LRATIO 4.65217               /* Target ratio for length/diameter for Legs        */
#define HEADFRAC 0.234               /* Target ratio for area of Head/Total Area         */
#define TORSOFRAC 0.332              /* Target ratio for area of Torso/Total Area        */
#define ARMFRAC 0.161                /* Target ratio for area of Arms/Total Area         */
#define LEGFRAC 0.273                /* Target ratio for area of Legs/Total Area         */
#define SMRATIO 1.35                 /* Target Surface to Mass Ratio                     */
#define BABYMASS 750.0               /* Target for Mass of Simulator                     */
define CLEAR "\x1B[2J"              /* Escape sequence to clear screen.                 */ float headwgt, torsowgt, armwgt, legwgt, areawgt, masswgt, smrwgt;  /* These variables contain the weighting factors for */
                                                                    /* determining the error as defined in the error     */
                                                                    /* function. This weighting s an "importance" given  */
                                                                    /* to any deviation from the appropriate target value. */ typedef struct                       /* This is a structure which defines the variable that */
{    float dia;                      /* describe a "bodypart". Because each body part        */
     float len;                      /* is cylindrical it may be described by its diameter.  */
     float area;                     /* and length. The other variables, area, mass, ratio   */
     float mass;                     /* are based on these two "state" variables. They       */
     float ratio;                    /* are given a place so that they may be calculated     */
} bodypart, *bodyptr;                /* only once, reducing execution time. This             */
                                     /* structure data type is called bodypart. A datatype   */
                                     /* bodyptr is a pointer to a bodypart.                  */

/* main(). The main function starts here. From within, it inputs weighting data and controls the iterative flow of the program. */
void main()
{    /* variable dclarations/initializations.                                                 */
     int counter = 1;                /* This variable keeps track of the number of            */
                                     /* iterations.                                           */
     float error, min_error = 9999999999.;   /* This is the initialization for the error.     */
     float head_ss, head_es, head_st;        /* These variables hold the starting size, ending */
     float torso_ss, torso_es, torso_st;     /* size, and step size for the diameter of the    */
     float arm_ss, arm_es, arm_st;           /* appropriate bodypart.                          */
     float leg_ss, leg_es, leg_st;

/* function prototypes. A description of each of the functions is located with the function definition below. */
          void print1(char what[5], bodyptr pt12);
          void printout(bodyptr pt8, bodyptr pt9, bodyptr pt10, bodyptr pt11);
          void cylinder_geo(bodyptr pt7);
          void two_cylinder_geo(bodyptr pt2);
          float find_error(bodyptr pt3, bodyptr pt4, bodyptr pt5, bodyptr pt6);

/* declarations and initialization of the bodyparts. The bodyparts with the min_ prefix store the part associated */
     /* with the current minimum error value.                                                                          */
          bodypart head, torso, arm, leg, min_head, min_torso, min_arm, min_leg;
          bodyptr ptrhd = &head, ptrtso = &torso, ptrleg = &leg, ptrarm = &arm;
          bodyptr ptrhd_min = &min_head, ptrtso_min = &min_torso;
          bodyptr ptrarm_min = &min_arm, ptrleg_min = &min_leg;
```

```
/* This is the input portion of the main() function.                                                               */
printf(CLEAR);                                          /* First, the screen is cleared.                            */
printf("Enter the weighting of the factors in the error function.\n");
printf("Enter Head weighting factor.");                 /* The user is promted for the appropriate weighting       */
scanf("%5f",&headwgt);                                  /* factor for each weighted portion of the error.          */
printf("\nEnter Torso weighting factor.");
scanf("%5f",&torsowgt);
printf("\nEnter Arm weighting factor.");
scanf("%5f",&armwgt);
printf("\nEnter Leg weighting factor.");
scanf("%5f",&legwgt);
printf("\nEnter Area weighting factor.");
scanf("%5f",&areawgt);
printf("\nEnter Mass weighting factor.");
scanf("%5f",&masswgt);
printf("\nEnter SMR weighting factor.");
scanf("%5f",&smrwgt);
printf(CLEAR);                                          /* After the weightings are entered, the screen is          */
printf("Head Data\n   Starting Size  Ending Size  Step\n");  /* cleared. Next the user is prompted for the         */
scanf("%f %f %f", &head_ss, &head_es, &head_st);        /* startin size, ending size, and step size for each of    */
printf("Torso Data\n   Starting Size  Ending Size  Step\n"); /* the bodyparts. These are the limits for the error  */
scanf("%f %f %f", &torso_ss, &torso_es, &torso_st);     /* loops.                                                  */
printf("\n\nArm Data\n   Starting Size  Ending Size  Step\n");
scanf("%f %f %f", &arm_ss, &arm_es, &arm_st);
printf("\n\nLeg Data\n   Starting Size  Ending Size  Step\n");
scanf("%f %f %f", &leg_ss,&leg_es,&leg_st);
printf(CLEAR);

/* This is the beginning of the loops to calculate the error.                                                       */
      printf("\x1B[5;15f of %d",(11*(int)((head_es - head_ss + 1)/head_st)));  /* Screen label to track progress   */
      ptrhd -> dia = head_ss;                           /* Initialize Head diameter to starting size               */
/*1*/ while (ptrhd -> dia <= head_es)                   /* Loop through all head sizes until head is > ending size */
      {  ptrhd -> ratio = HRATIO;                       /* Set Length/Diameter ratio to starting ratio predefined  */
/*2*/    while (ptrhd -> ratio <= 1.5*HRATIO)           /* Loop through all lengths until lenth is 1.5 times ratio */
         {  cylinder_geo(ptrhd);                        /* Calculate other parameters of head                      */
            ptrtso -> dia = torso_ss;                   /* Initialize Torso Diameter to starting size              */
/*3*/       while(ptrtso -> dia <= torso_es)            /* Loop through all Torso dia. until dia. > ending size    */
            {  ptrtso -> ratio = TRATIO;                /* Set Length/Diameter ratio to starting ratio predefined  */
/*4*/         while(ptrtso -> ratio < 1.5*TRATIO)       /* Loop through all lengths until length is 1.5 time ratio */
              {  cylinder_geo(ptrtso);                  /* Calculate other parameters of torso                     */
                 ptrarm -> dia = arm_ss;                /* Initialize Arm diameter to starting size                */
/*5*/            while(ptrarm -> dia <= arm_es)         /* Loop through all Arm dia. until dia. > ending size      */
                 {  ptrarm -> ratio = ARATIO;           /* Set length/diameter ratio to starting ratio predefined  */
/*6*/               while(ptrarm -> ratio < 1.5*ARATIO) /* Loop through all lengths until length is 1.5 times ratio*/
                    {  two_cylinder_geo(ptrarm);        /* Calculate other parameters of arms                      */
                       ptrleg -> dia = leg_ss;          /* Initialize Leg Diameter to starting size                */
/*7*/                  while(ptrleg -> dia <= leg_es)   /* Loop through all Leg dia. until dia. > ending size      */
                       {  ptrleg -> ratio = LRATIO;     /* Set length/diameter ratio to starting ratio predefined  */
/*8*/                     while(ptrleg -> ratio <= 2.0*LRATIO) /* Loop through all lengths until length is 2X ratio*/
                          {  two_cylinder_geo(ptrleg);  /* Calculate other leg parameters                          */
                             error = find_error(ptrhd,ptrtso,ptrarm,ptrleg); /* Calculate error from target values */
                             if(error < min_error)      /* Compare error to previous minimum                       */
                             {  printf("\x1B[11;10f %f",error);   /* If error minumum, then store values           */
                                min_error = error;
                                min_head = head;
                                min_torso = torso;
                                min_arm = arm;
                                min_leg = leg;
                                printf("\x1B[14;0fHead Dia = %lf cm\n",ptrhd -> dia); /* Write new error to screen */
                                printf("Head Length = %lf cm\n",ptrhd -> len);
                                printf("Torso Dia = %lf cm\n",ptrtso -> dia);
                                printf("Torso Length = %lf cm\n", ptrtso -> len);
                                printf("Arm Dia = %lf cm\n",ptrarm -> dia);
                                printf("Arm Length = %lf cm\n",ptrarm -> len);
                                printf("Leg Dia = %lf cm\n",ptrleg -> dia);
                                printf("Leg Length = %lf cm\n",ptrleg -> len);
                             }
                             ptrleg -> ratio += LRATIO * .05;   /* Increment Leg Length                            */
/*8*/                     }
                             ptrleg -> dia += leg_st;           /* Reset Leg diameter to starting size             */
/*7*/                  }
                       ptrarm -> ratio += ARATIO * .05;         /* Increment Arm Length                            */
```

```
/*6*/                    }
                         ptrarm -> dia += arm_st;            /* Reset arm diameter to starting size       */
/*5*/                }
                     ptrtso -> ratio += TRATIO * .05;        /* Increment Torso Length                    */
/*4*/            }
                 ptrtso -> dia += torso_st;                  /* Reset Torsor diameter to starting size    */
/*3*/        }
             printf("\x1B[5;5f%d",counter++);                /* Increment counter to update progress      */
             ptrhd -> ratio += HRATIO * .05;                 /* Increment Head Length                     */
/*2*/    }
         ptrhd -> dia += head_st;                            /* Reset Head diameter to starting size      */
/*1*/ }
     printf("\x1B[22;10fPress any key to quit, Press shift-PrintScrn to Print");  /* Give opportunity to printout data */
     if(getch()=='p') printout(ptrhd_min, ptrtso_min, ptrarm_min, ptrleg_min);
}

/* cylinder_geo() This function takes a pointer to a structure describing some dimensions of the head or torso and places into the same
structure the mass and surface area of the component considered.*/
void cylinder_geo(bodyptr ptr7)
{    float id = ptr7 -> dia - 0.04, od = ptr7 -> dia;
     ptr7 -> len = ptr7 -> dia * ptr7 -> ratio;
     ptr7 -> area = PI * (od * ptr7 -> len + id*id/2.);
     ptr7 -> mass = .35624 * ptr7 -> area + PI/4. * id*id * ptr7 -> len;
}

/* two_cylinder_geo() This function is similar to cylinder_geo() except it works on the cylindrical body components with two appendedges
each: arms, legs.*/
void two_cylinder_geo(bodyptr ptr2)
{    float id = ptr2 -> dia - 0.04, od = ptr2 -> dia;
     ptr2 -> len = ptr2 -> dia * ptr2 -> ratio;
     ptr2 -> area = 2 * PI * (od * ptr2 -> len + id*id/2.);
     ptr2 -> mass = .35624 * ptr2 -> area + PI/2. * id*id * ptr2 -> len;
}

/* find_error() This function takes 4 pointers to structures and, using this data, determines an error based on deviations from target values for
mass, surface to mass ratio, area, and percentage of bodypart area with respect to total area. The error is the sum of the squares of these
deviations with each deviation multiplied by a weighting factor.*/
float find_error(bodyptr ptr3, bodyptr ptr4, bodyptr ptr5, bodyptr ptr6)
{    float total_area, total_mass, surface_to_mass, h_e, t_e, a_e, l_e;
     float ar_e, ms_e, sm_e, fraction_error, total_error;
     total_area = ptr3->area + ptr4->area + ptr5->area + ptr6->area;
     total_mass = ptr3->mass + ptr4->mass + ptr5->mass + ptr6->mass;
     surface_to_mass = total_area/total_mass;
     h_e = (ptr3->area/total_area - HEADFRAC)/HEADFRAC;
     t_e = (ptr4->area/total_area - TORSOFRAC)/TORSOFRAC;
     a_e = (ptr5->area/total_area - ARMFRAC)/ARMFRAC;
     l_e = (ptr6->area/total_area - LEGFRAC)/LEGFRAC;
     ar_e = (total_area - SMRATIO*total_mass)/(SMRATIO*total_mass);
     ms_e = (total_mass - BABYMASS)/BABYMASS;
     sm_e = (surface_to_mass - SMRATIO)/SMRATIO;
     fraction_error = pow((headwgt*h_e*h_e + torsowgt*t_e*t_e + armwgt*a_e*a_e + wgt*l_e*l_e),0.5);
     total_error = pow(fraction_error,2) + areawgt*ar_e*ar_e + masswgt*ms_e*ms_e + smrwgt*sm_e*sm_e;
     return(total_error);
}

/* printout(). This function takes 4 pointers to bodyparts and prints out the entire set of relevent parameters */
void printout(bodyptr pt8, bodyptr pt9, bodyptr pt10, bodyptr pt11)
{    int a;
     fprintf(stdout,"OUTPUT FROM \"BABYGEO3\"\x0D\n");
     fprintf(stdout,"Bodypart Dia  Length Area Copper Water Total Surf\x0D\n");
     fprintf(stdout,"                           mass  mass  mass  mass\x0D\n");
     for(a=0; a<80; a++, fprintf(stdprn,"-"));
     print1("Head ",pt8);
     print1("Torso",pt9);
     print1("Arms ",pt10);
     print1("Legs ",pt11);
}

/* print1(). This function is called 4 times by printout to prin a line of data for each type of bodypart */
void print1(char what[5], bodyptr pt12)
{    char strgform[60];
     char *nl = "\x0D\n", *fmt = "  %5.3f %5.3f %5.1f %5.1f %5.1f %5.1f %5.3f", *nm = what;
     float copmass;
```

```
    float h2omass;
    float surf_2_mass;
    float id = pt12->dia - .08;
    copmass = pt12->area * .35624;
    h2omass = pt12->len * PI/2. *id*id;
    if(strcmp("Head ",what) && strcmp("Torso",what))
        h2omass = 0.5 * h2omass;
    surf_2_mass = pt12->area / pt12->mass;
    strcat(strgform, nl);
    strcat(strgform, nm);
    strcat(strgform, fmt);
    fprintf(stdout, strgform, pt12->dia, pt12->len, pt12->area, copmass, h2omass, pt12->mass, surf_2_mass);
}
```

Sample Printout

```
                                                    7/25
                                                    within .025 cn
                                                    Walls:
     55          of 484                                10
                                                        8
                                                        5
                                                        5
                1.444456                                5
                                                        8 -
                                                        8
     Head Dia    = 4.840000 cm                          9
     Head Length = 7.259998 cm
     Torso Dia    = 4.590000 cm
     Torso Length = 11.839137 cm
     Arm Dia      = 1.365000 cm
     Arm Length   = 11.875503 cm
     Leg Dia      = 1.650000 cm
     Leg Length   = 17.654989 cm
            Press any key to quit. Press shift-PrintScrn to Print
```

What is claimed is:

1. An infant simulator for modeling the thermal properties of a premature infant comprising:
   a head,
   a pair of arms,
   a pair of legs,
   a torso,
   a fluid circuit connecting and supplying fluid from a fluid source to said pair of arms, pair of legs and torso,
   a pump in said torso for circulating fluid through said simulator, and
   means in said simulator for simulating insensible water loss in a premature infant.

2. The infant simulator of claim 1 wherein said simulator models the thermal properties of an about 650 gram infant and wherein said pump generates a fluid flow rate of about 125 ml/min.

3. The infant simulator of claim 1 further including a heater in said torso.

4. The infant simulator of claim 3 wherein said simulator models the thermal properties of an about 650 gram infant and wherein said heater generates about 7.9 W.

5. The infant simulator of claim 3 further including a controller for controlling said pump and heater.

6. An infant simulator for modeling the thermal properties of a premature infant comprising:
   a head,
   a pair of arms,
   a pair of legs,
   a torso,
   a fluid circuit connecting and supplying fluid from a fluid source to said pair of arms, pair of legs and torso, and
   a pump in said torso for circulating fluid through said simulator,
   wherein said head, pair of arms, pair of legs and torso are constructed of thin walled copper cylinders painted black.

7. The infant simulator of claim 6 wherein said simulator models the thermal properties of an about 650 gram infant and wherein said head cylinder is about 2.858 in long and has an outside diameter of about 1.906 in, each of said arm cylinders is about 4.673 in long and has an outside diameter of about 0.540 in, each of said leg cylinders is about 6.949 in long and has an outside diameter of about 0.650 in, and said torso cylinder is about 4.661 in long and has an outside diameter of about 1.807 in.

8. The infant simulator of claim 7 wherein each of said cylinders has a wall thickness of about 0.016 in.

9. An infant simulator for modeling the thermal properties of a premature infant comprising:
   a head,
   a pair of arms,
   a pair of legs,
   a torso,
   a fluid circuit connecting and supplying fluid from a fluid source to said pair of arms, pair of legs and torso, and
   a pump in said torso for circulating fluid through said simulator,
   said simulator further including a manifold in said torso, a respective supply tube connecting said manifold to said head, each said arm, each said leg and said torso, and a respective return tube connecting said head, each said arm and each said leg to said torso.

10. An infant simulator for modeling the thermal properties of a premature infant comprising:
   a head,
   a pair of arms,
   a pair of legs,
   a torso,
   a fluid circuit connecting and supplying fluid from a fluid source to said pair of arms, pair of legs and torso, and
   a pump in said torso for circulating fluid through said simulator,
   wherein said torso includes means for simulating insensible water loss in a premature infant.

11. The infant simulator of claim 10 wherein said simulating means includes an aperture in said torso, and filter media covering said aperture.

12. The infant simulator of claim 11 wherein said simulator models the thermal properties of an about 650 gram infant and wherein said aperture has an area of about 5.177 in$^2$.

13. The infant simulator of claim 10 wherein said simulator models the thermal properties of an about 650 gram infant and wherein said simulator has an insensible water loss rate of about 2.0 g/hr.

14. An infant simulator for modeling the thermal properties of a premature infant comprising:
   a head,
   a pair of arms,
   a pair of legs,
   a torso,
   a fluid circuit connecting and supplying fluid from a fluid source to said pair of arms, pair of legs and torso, and
   means for simulating insensible water loss in a premature infant comprising an aperture in said torso, and filter media covering said aperture.

15. The infant simulator of claim 14 wherein said head, pair of arms, pair of legs and torso are constructed of thin walled copper cylinders painted black.

16. The infant simulator of claim 15 wherein said simulator models the thermal properties of an about 650 gram infant and wherein said head cylinder is about 2.858 in long and has an outside diameter of about 1.906 in, each of said arm cylinders is about 4.673 in long and has an outside diameter of about 0.540 in, each of said leg cylinders is about 6.949 in long and has an outside diameter of about 0.650 in, and said torso cylinder is about 4.661 in long and has an outside diameter of about 1.807 in.

17. The infant simulator of claim 16 wherein each of said cylinders has a wall thickness of about 0.016 in.

18. The infant simulator of claim 14 further including a manifold in said torso, a respective supply tube connecting said manifold to said head, each said arm each said leg and said torso, and a respective return tube connecting said head, each said arm and each said leg to said torso.

19. The infant simulator of claim 14 wherein said simulator models the thermal properties of an about 650 gram infant and wherein said aperture has an area of about 5.177 in$^2$.

20. The infant simulator of claim 19 wherein said simulator has an insensible water loss rate of about 2.0 g/hr.

21. The infant simulator of claim 14 further including a pump in said torso for circulating fluid through said simulator.

22. The infant simulator of claim 21 wherein said simulator models the thermal properties of an about 650 gram infant and wherein said pump generates a fluid flow rate of about 125 ml/min.

23. The infant simulator of claim 14 further including a heater in said torso.

24. The infant simulator of claim 23 wherein said simulator models the thermal properties of an about 650 gram infant and wherein said heater generates about 7.9 W.

25. The infant simulator of claim 23 further including a controller for controlling said pump and heater.

26. An infant simulator for modeling the thermal properties of a premature infant comprising:
   a head,
   a pair of arms,
   a pair of legs,
   a torso,
   a fluid circuit connecting and supplying fluid from a fluid source to said pair of arms, pair of legs and torso,
   a pump in said torso for circulating fluid through said simulator, and
   means for simulating insensible water loss in a premature infant comprising an aperture in said torso, and filter media covering said aperture.

27. An infant simulator for modeling the thermal properties of a premature infant comprising:
   a torso,
   at least three appendages,
   a fluid circuit connecting and supplying fluid from a fluid source to said torso and appendages, and
   means for simulating insensible water loss comprising an aperture in at least one of said torso and appendages, and filter media covering said aperture.

28. The infant simulator of claim 27 further comprising:
   a pump in said torso for circulating fluid through said simulator.

* * * * *